(12) United States Patent
Liberg et al.

(10) Patent No.: US 10,142,876 B2
(45) Date of Patent: *Nov. 27, 2018

(54) SYSTEM OVERLOAD CONTROL WHEN IN EXTENDED COVERAGE

(71) Applicant: TELEFONAKTIEBOLAGET L M ERICSSON (PUBL), Stockholm (SE)

(72) Inventors: Olof Liberg, Stockholm (SE); Mårten Sundberg, Årsta (SE); John Walter Diachina, Garner, NC (US); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 317 days.

This patent is subject to a terminal disclaimer.

(21) Appl. No.: 14/829,546

(22) Filed: Aug. 18, 2015

(65) Prior Publication Data

US 2016/0057646 A1    Feb. 25, 2016

Related U.S. Application Data

(60) Provisional application No. 62/040,154, filed on Aug. 21, 2014.

(51) Int. Cl.
*H04W 28/02* (2009.01)
*H04W 48/06* (2009.01)
(Continued)

(52) U.S. Cl.
CPC ....... *H04W 28/0205* (2013.01); *H04W 48/06* (2013.01); *H04W 48/12* (2013.01);
(Continued)

(58) Field of Classification Search
None
See application file for complete search history.

(56) References Cited

U.S. PATENT DOCUMENTS 6,122,327 A      9/2000 Watanabe et al.
7,620,125 B1 *  11/2009 Chang ................. H04L 27/0014
                                                    375/316
(Continued)

FOREIGN PATENT DOCUMENTS

EP      2346295 A1     7/2011
EP      3079385 A1    10/2016
(Continued)

OTHER PUBLICATIONS

Ericsson: "GSM Evolution for cellular IoT—AGCH Overview". 3GPP TSG GERAN#63, Tdoc GP-140604. Aug. 2014. Ljubljana, Slovenia, the whole document.

(Continued)

*Primary Examiner* — Steve R Young

(57) ABSTRACT

A network node (e.g., base station, eNodeB) is described herein which indicates an implicit reject status in at least one of a frequency correction channel (FCCH) block or a synchronization channel (SCH) block, and transmits the at least one of the FCCH block or the SCH block to at least one wireless device. Further, a wireless device is described herein which receives the at least one of the FCCH block or the SCH block, determines if the received at least one of the FCCH block or the SCH block indicates an implicit reject status is set, and when the received at least one of the FCCH block or the SCH block indicates the implicit reject status is set and when the wireless device has a specific configuration, determines not to attempt to access the wireless communication system.

30 Claims, 6 Drawing Sheets

(51) Int. Cl.
*H04W 72/04* (2009.01)
*H04W 56/00* (2009.01)
*H04W 48/12* (2009.01)

(52) U.S. Cl.
CPC ....... *H04W 56/00* (2013.01); *H04W 72/0406* (2013.01); *H04W 72/0446* (2013.01); *H04W 28/0289* (2013.01)

(56) References Cited

U.S. PATENT DOCUMENTS

| | | | |
|---|---|---|---|
| 8,554,882 B2* | 10/2013 | Belinchon Vergara | ................... G06F 21/6218 370/254 |
| 8,670,339 B2 | 3/2014 | Diachina et al. | |
| 8,971,204 B2 | 3/2015 | Diachina et al. | |
| 9,271,316 B2* | 2/2016 | Bakker | ............... H04W 76/021 |
| 2002/0039904 A1 | 4/2002 | Anderson | |
| 2003/0186694 A1* | 10/2003 | Sayers | .................. H04L 69/169 455/426.1 |
| 2005/0118957 A1 | 6/2005 | Flitton | |
| 2008/0194256 A1* | 8/2008 | Tran | .................. H04W 56/0035 455/434 |
| 2008/0285668 A1* | 11/2008 | Lee | ....................... H04L 5/0053 375/260 |
| 2010/0248771 A1 | 9/2010 | Brewer et al. | |
| 2010/0304706 A1 | 12/2010 | Haverty | |
| 2011/0075621 A1 | 3/2011 | Sung et al. | |
| 2012/0093008 A1* | 4/2012 | Diachina | ............. H04L 43/0876 370/252 |
| 2012/0140709 A1 | 6/2012 | Hou | |
| 2013/0258938 A1 | 10/2013 | Sågfors et al. | |
| 2013/0336281 A1* | 12/2013 | Ahn | .................... H04W 72/082 370/330 |
| 2014/0003349 A1 | 1/2014 | Kang et al. | |
| 2014/0051437 A1 | 2/2014 | Diachina | |
| 2014/0014667 A1 | 5/2014 | Diachina et al. | |
| 2014/0128085 A1* | 5/2014 | Charbit | ..................... H04L 5/00 455/450 |
| 2014/0213261 A1 | 7/2014 | Das et al. | |
| 2014/0355596 A1* | 12/2014 | Juncker | ............. H04W 56/0035 370/350 |
| 2015/0245227 A1 | 8/2015 | Patel et al. | |
| 2016/0050667 A1 | 2/2016 | Papasakellariou et al. | |
| 2016/0057646 A1 | 2/2016 | Liberg et al. | |
| 2017/0019750 A1* | 1/2017 | Palanisamy | ......... H04W 76/066 |
| 2017/0019930 A1 | 1/2017 | Lee et al. | |
| 2017/0142718 A1* | 5/2017 | Gong | ................ H04W 72/0446 |

FOREIGN PATENT DOCUMENTS

| | | |
|---|---|---|
| WO | 2006072967 A1 | 7/2006 |
| WO | 2009038367 A1 | 3/2009 |
| WO | 2009132674 A1 | 11/2009 |
| WO | WO 2011/119680 A2 | 9/2011 |
| WO | WO 2012/049604 A1 | 4/2012 |

OTHER PUBLICATIONS

Ericsson: "GSM Evolution for Cellular IoT—PCH Overview". 3GPP TSG GERAN#63, Tdoc GP-140605. Aug. 2014. Ljubljana, Slovenia, the whole document.

Vodafone: "On the Need for New Establishment Causes for Devices Configured for MTC-LTE". 3GPP TSG RAN WG2 #71bis. R2-105484. Oct. 2010. Xi'an, China, the whole document.

Vodafone Group PLC: "M2M overload control"/ 3GPP TSG GERAN WG2 Meeting #47bis. G2-100336. Oct. 2010. Vienna, Austria, the whole document.

Nokia Siemens Networks: "Randomization of the extended wait time". 3GPP TSG SA WG2 Meeting #79E (Electronic). TD S2-103155. Jul. 2010. Elbonia, the whole document.

Catt: "RRC Connection Control for MTC Device". 3GPP TSG RAN WG2 Meeting #71bis. R2-105387. Oct. 2010. Xi'an, China, the whole document.

Zte, et al.: "Back-off time randomization for overload control". 3GPP TSG SA WG2 Meeting #79E (Electronic). TD-S2-103214 (revision 2 of S2-103125). Jul. 2010. Elbonia, the whole document.

$3^{rd}$ Generation Partnership Project; Technical Specification Group Services and System Aspects; System Improvements for Machine-Type Communications; (Release 10). 3GPP TR 23.888 v1.0.0 (Jul. 2010), the whole document.

$3^{rd}$ Generation Partnership Project; Technical Specification Group GSM/EDGE Radio Access Network; Mobile radio interface layer 3 specification; Radio Resource Control (RRC) protocol (Release 10). 3GPP TS 44.018 v10.0.0 (Sep. 2010), the whole document.

$3^{rd}$ Generation Partnership Project; Technical Specification Group Services and System Aspects; System Improvements for Machine-Type Communications; (Release 12). 3GPP TS 44.018 V.12.2.0 (Mar. 2014), the whole document.

Ericsson: "GSM optimization for Internet of Things," 3GPP Draft; GP-140297; 3rd Generation Partnership Project; TSG Geran; Valencia, Spain; May 26, 2014.

3rd Generation Partnership Project; Technical Specification Group GSM/EDGE Radio Access Network; Mobile radio interface layer 3 specification; Radio Resource Control (RRC) protocol (Release 12); vol. GERAN WG2; No. V12.2.0; Mar. 5, 2014.

\* cited by examiner

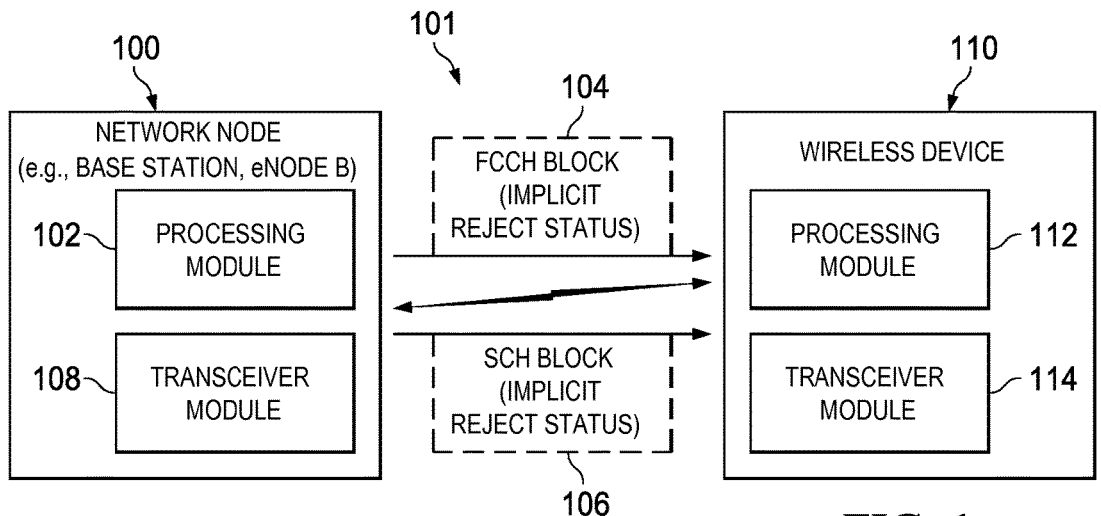
FIG. 1
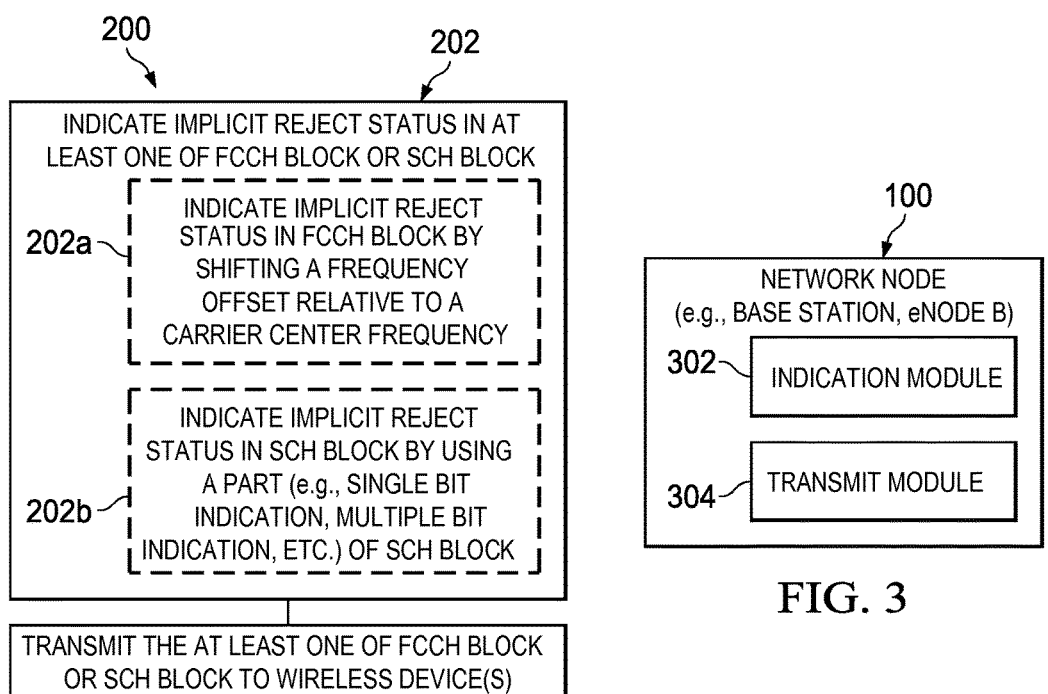
FIG. 2
FIG. 3

SYSTEM OVERLOAD CONTROL WHEN IN EXTENDED COVERAGE

CLAIM OF PRIORITY

This application claims the benefit of priority to U.S. Provisional Application No. 62/040,154, filed on Aug. 21, 2014, the entire contents of which are hereby incorporated by reference for all purposes.

TECHNICAL FIELD

The present disclosure relates generally to the field of wireless communications, and more particularly to system overload control when in extended coverage.

BACKGROUND

The following abbreviations and terms are herewith defined, at least some of which are referred to within the following description of the present disclosure.
3GPP 3rd-Generation Partnership Project
AGCH Access Grant Channel
ASIC Application Specific Integrated Circuit
BLER Block Error Rate
CDMA Code Division Multiple Access
CN Core Network
CRC Cyclic Redundancy Check
DL Downlink
DSP Digital Signal Processor
EDGE Enhanced Data rates for GSM Evolution
EGPRS Enhanced General Packet Radio Service
FCCH Frequency Correction Channel
GMSK Gaussian Minimum Shift Keying
GSM Global System for Mobile Communications
HARQ Hybrid Automatic Repeat Request
IoT Internet of Things
LTE Long-Term Evolution
M2M Machine-to-Machine
MCS Modulation and Coding Scheme
MS Mobile Station
MTC Machine-Type Communications
PCH Paging Channel
PLMN Public Land Mobile Network
RACH Random Access Channel
SCH Synchronization Channel
TDMA Time Division Multiple Access
TSC Training Sequence Code
UE User Equipment
UL Uplink
WCDMA Wideband Code Division Multiple Access
WiMAX Worldwide Interoperability for Microwave Access
Coverage Class: At any point in time a device belongs to a specific uplink/downlink coverage class which determines the total number of blind transmissions to be used when transmitting/receiving radio blocks. An uplink/downlink coverage class applicable at any point in time can differ between different logical channels. Upon initiating a system access a device determines the uplink/downlink coverage class applicable to the RACH/AGCH based on estimating the number of blind repetitions of a radio block needed by the BSS receiver/device receiver to experience a BLER (block error rate) of approximately 10%. The BSS determines the uplink/downlink coverage class to be used by a device on the device's assigned packet channel resources based on estimating the number of blind repetitions of a radio block needed to satisfy a target BLER and considering the number of HARQ retransmissions (of a radio block) that will, on average, result from using that target BLER.

Extended Coverage: The general principle of extended coverage is that of using blind repetitions for the control channels and for the data channels. In addition, for the data channels the use of blind repetitions assuming MCS-1 (i.e., the lowest MCS supported in EGPRS today) is combined with HARQ retransmissions to realize the needed level of data transmission performance. Support for extended coverage is realized by defining different coverage classes. A different number of blind repetitions are associated with each of the coverage classes wherein extended coverage is associated with coverage classes for which multiple blind repetitions are needed (i.e., a single blind repetition is considered as the reference coverage). The number of total blind transmissions for a given coverage class can differ between different logical channels.

Implicit Reject Status: This is a system access control mechanism used to prevent variable percentages of wireless devices from attempting system access according to the loading of the RACH. The wireless devices read the SCH prior to attempting system access and determine the value of the Implicit Reject Status (IRS) parameter therein to determine if system access using the RACH is allowed. This determination will, for example, be made based on the type of application layer payload that is available for transmission and whether or not that type of payload information is currently allowed according to the Implicit Reject Status parameter. Blocking the use of RACH for a variable percentage of wireless devices using IRS is realized by setting the IRS parameter to indicate a certain blocking condition for a percentage of SCH transmissions that reflects the target blocking rate (e.g., setting the IRS parameter to indicate a target blocking condition for 10% of the time will block about 10% of wireless devices subject to that blocking condition from using the RACH).

There are several ways in cellular systems today to control system access by a wireless device if there is congestion within the cellular system. One example is to use access class barring where the system includes a barring mask sent within the System Information to indicate the subset of wireless device access classes that are barred from accessing the system. Another example and more immediate (i.e., more real time) congestion control scheme which is supported in Global System for Mobile (GSM) systems and Enhanced Data Rates for GSM evolution (EDGE) systems is the implicit reject feature that mandates a wireless device to read an access grant channel (AGCH) or paging channel (PCH) in the downlink (DL) and look for the implicit reject flag (reference 3GPP TS 44.018 V12.2.0 (2014-03)—the contents of which are incorporated by reference herein). If the implicit reject flag is set and the wireless device is configured for low access priority, then the wireless device is not allowed to access the cellular system. The implicit reject flag is only relevant to wireless devices configured for low access priority and hence the behavior of higher priority wireless devices is transparent to the implicit reject indication.

When extending the coverage of the GSM/EDGE system to cater for wireless devices in radio coverage that is worse than what is typically supported by the cellular system, the use of repetitions is foreseen in which a specific block is repeated a number of times by the transmitter in order for the receiver to accumulate the repeated blocks and thereby be able to decode that specific block.

Although wireless devices in more diverse deployments can be reached by the use of repetitions, the drawback is that the system capacity can be greatly impacted due to the additional radio transmissions resulting from the repetitions (i.e., each repetition requires a distinct radio transmission).

Consider an example where it is determined that 16 repetitions (i.e., 16 transmissions) are needed to reach a 20 dB coverage improvement in the GSM/EDGE. In this example, the transmitting of the same information to two different wireless devices, in terms of radio resources utilized, could differ by a factor of 16. Unfortunately, the wireless devices configured for low access priority that are in deep coverage holes (requiring for example 16 repetitions) and that monitor the AGCH and PCH for the implicit reject flag, will not be able to decode a DL radio block after receiving a single transmission thereof and will therefore not be able to determine the implicit reject status information included therein. The net result of this is that, until these low priority access wireless devices can determine the implicit reject status, they will default to assuming the system access is barred and thereby experience a significant delay prior to attempting to access the cellular system (i.e., even when implicit reject status indicates system access is allowed).

One way of solving this problem is to, in every DL AGCH block or PCH block, send the blocks with the maximum number of repetitions (for example 16) needed to reach all of the wireless devices. However, this scheme will consume extensive radio resources in the cellular system and would require an over-dimensioning of the AGCH and/or PCH resources. This particular problem and other problems associated with the prior art are addressed in the present disclosure.

SUMMARY

A network node, a wireless device, and various methods for addressing at least the aforementioned problem are described in the independent claims. Advantageous embodiments of the network node, the wireless device and the various methods are further described in the dependent claims.

In one aspect, the present disclosure provides a network node configured to control system overload in a wireless communication system. The network node comprises a processing module configured to indicate an implicit reject status in at least one of a frequency correction channel (FCCH) block or a synchronization channel (SCH) block. Plus, the network node comprises a transceiver module configured to transmit the at least one of the FCCH block or the SCH block to at least one wireless device. The network node has an advantage in that it can more effectively convey implicit reject status information using the at least one of the FCCH block or the SCH block since the blocks need to be successfully acquired by a wireless device prior to attempting any given system access. By allowing wireless devices to acquire implicit reject status information without forcing these wireless devices to also read at least one DL AGCH block or PCH block (in addition to reading at least one of the FCCH block or the SCH block), the network node thereby extends the battery lifetime of wireless devices (especially those that do not have access to an external power source).

In another aspect, the present disclosure provides a method in a network node of a wireless communication system for controlling system overload. The method comprises an indicating step and a transmitting step. In the indicating step, the network node indicates an implicit reject status in at least one of a frequency correction channel (FCCH) block or a synchronization channel (SCH) block. In the transmitting step, the network node transmits the at least one of the FCCH block or the SCH block to at least one wireless device. The method has an advantage in that it enables the network node to more effectively convey implicit reject status information using the at least one of the FCCH block or the SCH block since the blocks need to be successfully acquired by a wireless device prior to attempting any given system access. By allowing wireless devices to acquire implicit reject status information without forcing these wireless devices to also read at least one DL AGCH block or PCH block (in addition to reading at least one of the FCCH block or the SCH block), the network node thereby extends the battery lifetime of wireless devices (especially those that do not have access to an external power source).

In yet another aspect, the present disclosure provides a wireless device configured to interface with a wireless communication system and further configured to control system overload. The wireless device comprises a transceiver module configured to receive at least one of a frequency correction channel (FCCH) block or a synchronization channel (SCH) block. Plus, the wireless device comprises a processing module configured to (i) determine if the received at least one of the FCCH block or the SCH block indicates an implicit reject status that is set, and (ii) when the received at least one of the FCCH block or the SCH block indicates the implicit reject status is set and when the wireless device has a specific configuration, determine not to attempt to access the wireless communication system. The wireless device has an advantage in that it effectively reduces its battery consumption by acquiring implicit reject status information using the at least one of the FCCH block or the SCH block which it must always successfully acquire prior to attempting any given system access and thereby avoids the need to also subsequently read the at least one DL AGCH block or PCH block to acquire implicit reject status information.

In still yet another aspect, the present disclosure provides a method in a wireless device that is configured to interface with a wireless communication system and further configured to control system overload. The method comprises a receiving step, a first determining step, and a second determining step. In the receiving step, the wireless device receives at least one of a frequency correction channel (FCCH) block or a synchronization channel (SCH) block. In the first determining step, the wireless device determines if the received at least one of the FCCH block or the SCH block indicates an implicit reject status is set. In the second determining step, the wireless device determines not to attempt to access the wireless communication system when the received at least one of the FCCH block or the SCH block indicates the implicit reject status is set and when the wireless device has a specific configuration. The method has an advantage in that it enables the wireless device to effectively reduce its battery consumption by acquiring implicit reject status information using the at least one of the FCCH block or the SCH block which it must always successfully acquire prior to attempting any given system access and thereby avoids the need to also subsequently read the at least one DL AGCH block or PCH block to acquire implicit reject status information.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 1 is a diagram of an exemplary wireless communication network which includes a network node (e.g., base station, eNodeB) and a wireless device, each of which are configured in accordance with an embodiment of the present disclosure;

FIG. 2 is a flowchart of a method implemented in the network node (e.g., base station, eNodeB) in accordance with an embodiment of the present disclosure;

FIG. 3 is a block diagram illustrating structures of an exemplary network node (e.g., base station, eNodeB) configured in accordance with an embodiment of the present disclosure;

DETAILED DESCRIPTION

Figure 4:
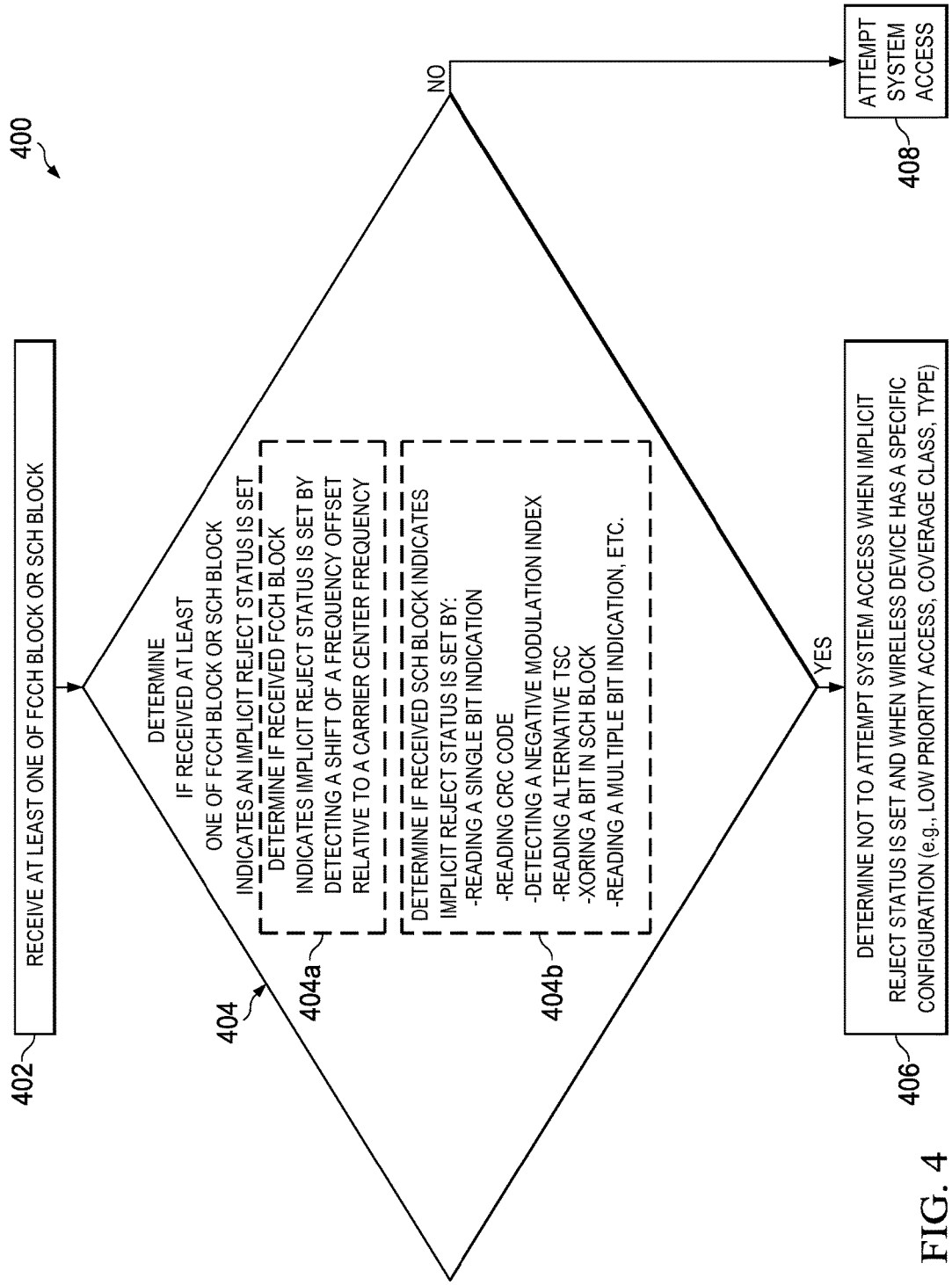
FIG. 4 is a flowchart of a method implemented in a wireless device in accordance with an embodiment of the present disclosure.

As discussed in the Background section, in the past the wireless devices that are configured for low access priority, are in deep coverage holes (needing for example 16 repetitions) and are monitoring the AGCH and PCH for the implicit reject flag, will not be able to decode a DL radio block after receiving a single transmission thereof and hence will not be able to determine the implicit reject status information included therein. The net result is that, until these low access priority wireless devices can determine the implicit reject status, they will default to assuming the system access is barred and thereby experience a significant delay prior to attempting to access the cellular system (i.e., even when implicit reject status indicates system access is allowed). One possible way of solving this problem is to, in every DL AGCH block or PCH block, send the blocks with the maximum number of repetitions (for example 16) needed to reach all of the wireless devices. However, this scheme will consume extensive radio resources in the cellular system and would require an over-dimensioning of the AGCH and/or PCH resources. The present disclosure addresses this problem as discussed hereinafter with respect to FIGS. 1-10.

Referring to FIG. 1, there is a diagram of an exemplary wireless communication network 101 which includes a network node 100 (e.g., base station 100, eNodeB 100) and a wireless device 110, each of which are configured in accordance with an embodiment of the present disclosure. As shown, the network node 100 (e.g., base station 100, eNodeB 100) includes (1) a processing module 102 configured to indicate an implicit reject status in at least one of a FCCH block 104 or a SCH block 106, and (2) a transceiver module 108 configured to transmit the at least one of the FCCH block 104 or the SCH block to at least one wireless device 110 (only one shown). The wireless device 110 includes (1) a transceiver module 114 configured to receive the at least one of the FCCH block 104 or the SCH block 106, and (2) a processing module 112 configured to (i) determine if the received at least one of the FCCH block 104 or the SCH block 106 indicates an implicit reject status is set, and (ii) when the received at least one of the FCCH block 104 or the SCH block 106 indicates the implicit reject status is set and when the wireless device 110 has a specific configuration (e.g., low priority access (i.e., non-prioritized access), coverage class, device type), determine not to attempt to access the wireless communication system 101 (i.e., network node 100).

Referring to FIG. 2, there is a flowchart of a method 200 implemented in the network node 100 (e.g., base station 100, eNodeB 100) in accordance with an embodiment of the present disclosure. At step 202, the network node 100 indicates an implicit reject status in the at least one of the FCCH block 104 or the SCH block 106. In one example the network node 100 at step 202a indicates the implicit reject status in the FCCH block 104 by shifting a frequency offset relative to a carrier center frequency to a level (amount) detectable by the at least one wireless device 110. For instance, the network node 100 can shift the frequency offset relative to the carrier center frequency to a level (amount) detectable by the at least one wireless device 110 to indicate the implicit reject status by one of the following: (i) using a negative modulation index for GMSK modulation, (ii) using an alternative (i.e., alternating) fixed bit pattern (it is to be noted that the conventional network node feeds its modulator with a stream of bits having form "0000000 . . . " to create a tone at +67 kHz offset, while in the present disclosure the network node 100 can feed its modulator with a stream of bits having form of "0101010101 . . . " to create a tone at −67 kHz offset), or (iii) using some other measure. In another example, the network node 100 at step 202b uses a part of the SCH block 106 to indicate the implicit reject status by one of the following: (i) including a single bit indication in a payload part of the SCH block 106; (ii) using an alternative CRC code in the SCH block 106; (iii) using a negative modulation index for GMSK modulation of the SCH block 106; (iv) using an alternative TSC in the SCH block 106; (v) adding a bit to the SCH block 106 to be XORed with a bit by the at least one wireless device 110; (vi) including a multiple bit indication in a payload part of the SCH block 106; or (vii) using some other measure. At step 204, the network node 100 transmits the at least one of the FCCH block 104 or the SCH block 106 to the at least one wireless device 110. A more detailed explanation of this method 200 along with various alternative methods 600, 700, 900 and 1000 associated with the present disclosure are discussed hereinafter.

Referring to FIG. 3, there is a block diagram illustrating structures of an exemplary network node 100 (e.g., base station 100, eNodeB 100) configured in accordance with an embodiment of the present disclosure. In one embodiment, the network node 100 may comprise an indication module 302 and a transmit module 304. The indication module 302 is configured to indicate an implicit reject status in the at least one of the FCCH block 104 or the SCH block 106. In one example the indicate module 302 indicates the implicit reject status in the FCCH block 104 by shifting a frequency offset relative to a carrier center frequency to a level (amount) detectable by the at least one wireless device 110. For instance, the indication module 302 can shift the frequency offset relative to the carrier center frequency to the level (amount) detectable by the at least one wireless device 110 to indicate the implicit reject status by one of the following: (i) using a negative modulation index for GMSK modulation, (ii) using an alternative (i.e., alternating) fixed bit pattern (it is to be noted that the conventional network node feeds its modulator with a stream of bits having form "0000000 . . . " to create a tone at +67 kHz offset while in the present disclosure the network node 100 can feed its modulator with a stream of bits having form of "0101010101 . . . " to create a tone at −67 kHz offset), or (iii) using some other measure. In another example, the indication module 302 indicates the implicit reject status by one of the following: (i) including a single bit indication in a payload part of the SCH block 106; (ii) using an alternative CRC code in the SCH block 106; (iii) using a negative modulation index for GMSK modulation of the SCH block 106; (iv) using an alternative TSC in the SCH block 106; (v) adding a bit to the SCH block 106 to be XORed with a bit by the at least one wireless device 110; (vi) including a multiple bit indication in a payload part of the SCH block 106; or (vii) using some other measure. The transmit module 304 is configured to transmit the at least one of the FCCH block 104 or the SCH block 106 to the at least one wireless device 110.

As those skilled in the art will appreciate, the above-described modules 302 and 304 of the network node 100 may be implemented separately as suitable dedicated circuits. Further, the modules 302 and 304 can also be implemented using any number of dedicated circuits through functional combination or separation. In some embodiments, the modules 302 and 304 may be even combined in a single application specific integrated circuit (ASIC). As an alternative software-based implementation, the network node 100 may comprise the processing module 102 which includes a memory, and a processor (including but not limited to a microprocessor, a microcontroller or a Digital Signal Processor (DSP), etc.), and the transceiver module 108. The memory stores machine-readable program code executable by the processor to cause the network node 100 to perform the steps of the above-described method 200. It should be appreciated that the network node 100 also includes many other well-known components, but for clarity, only the components needed to describe the features of the present disclosure are described herein.

Figure 9:
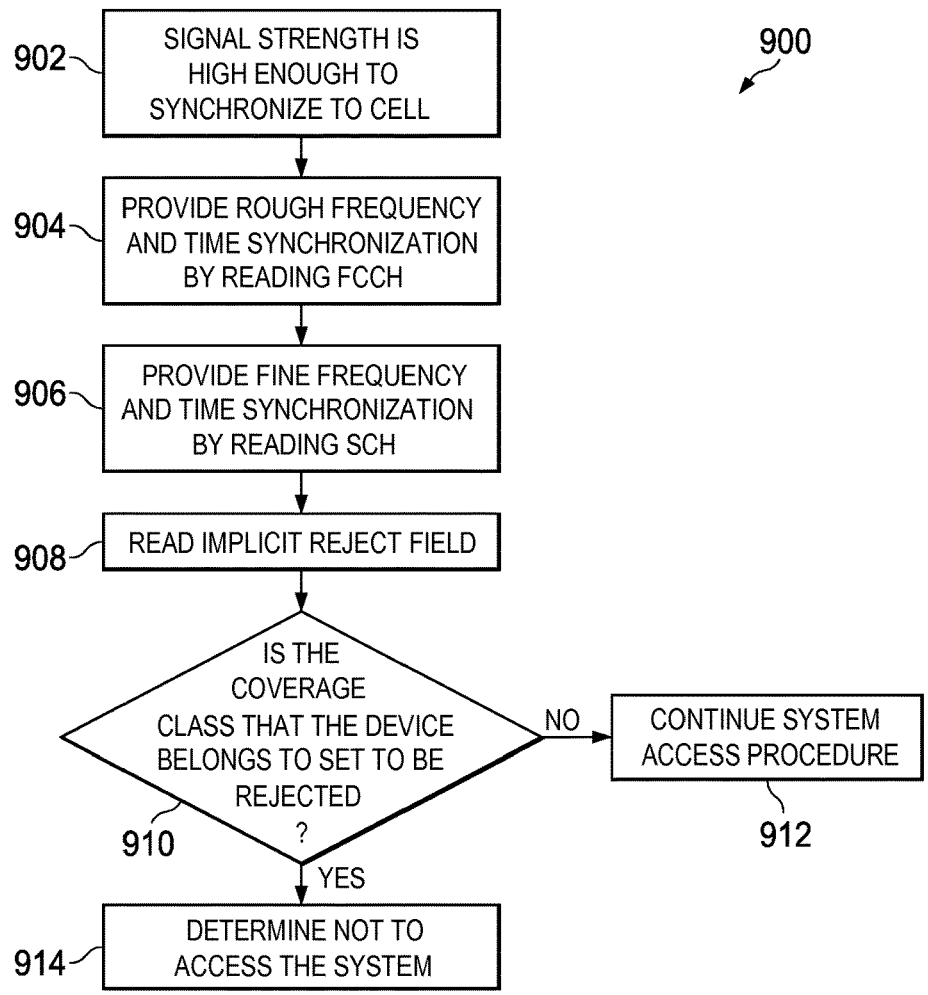
FIG. 9 is a flowchart of a method which is implemented by the wireless device in accordance with yet another embodiment of the present disclosure; and, FIG. 10 is a flowchart of a method which is implemented by the wireless device in accordance with still yet another embodiment of the present disclosure.
Figure 10:
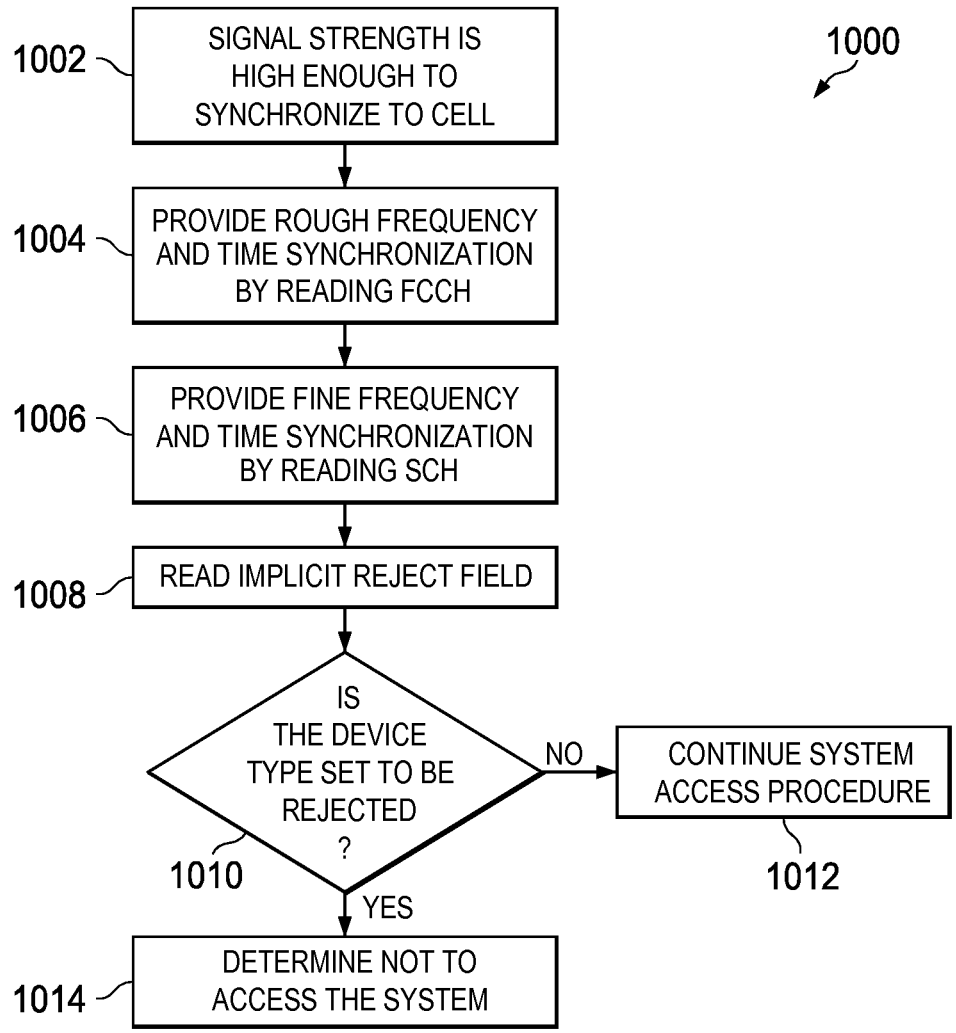

Referring to FIG. 4, there is a flowchart of a method 400 implemented in the wireless device 110 in accordance with an embodiment of the present disclosure. At step 402, the wireless device 110 receives at least one of the FCCH block 104 or the SCH block 106. At step 404, the wireless device 110 determines if the received at least one of the FCCH block 104 or the SCH block 106 indicates an implicit reject status is set. In one example, the wireless device 110 at step 404a determines if the received FCCH block 104 indicates the implicit reject status is set by detecting a shift of a frequency offset relative to a carrier center frequency in the received FCCH block 104. In another example, the wireless device 110 at step 404b determines if the received SCH block 106 indicates the implicit reject status is set by one of the following: (i) reading a single bit indication in a payload part of the SCH block 106; (ii) reading an alternative CRC code in the SCH block 106; (iii) detecting a negative modulation index for GMSK modulation of the SCH block 106; (iv) reading an alternative TSC in the SCH block 106; (v) XORing a bit with a bit in the SCH block 106; (vi) reading a multiple bit indication in a payload part of the SCH block 106; or (vii) some other measure. At step 406, the wireless device 110 determines not to attempt to access the wireless communication system 101 (i.e., network node 100) when the received at least one of the FCCH block 104 or the SCH block 106 indicates the implicit reject status is set and when the wireless device 110 has a specific configuration (e.g., low priority access, coverage class, device type). At step 408, the wireless device 110 attempts to access the wireless communication system 101 (i.e., network node 100) when the received at least one of the FCCH block 104 or the SCH block 106 indicates the implicit reject status is not set or is set but does not indicate the configuration of the wireless device 110 (i.e., in the later case, the implicit reject status is technicality not set from the viewpoint of the particular wireless device 110 because the implicit reject status (multi-bit implicit reject status) does not indicate the configuration of the particular wireless device 110, e.g., as illustrated in FIGS. 9-10). A more detailed explanation of this method 400 along with various alternative methods 600, 700, 900 and 1000 associated with the present disclosure are discussed hereinafter.

Figure 5:
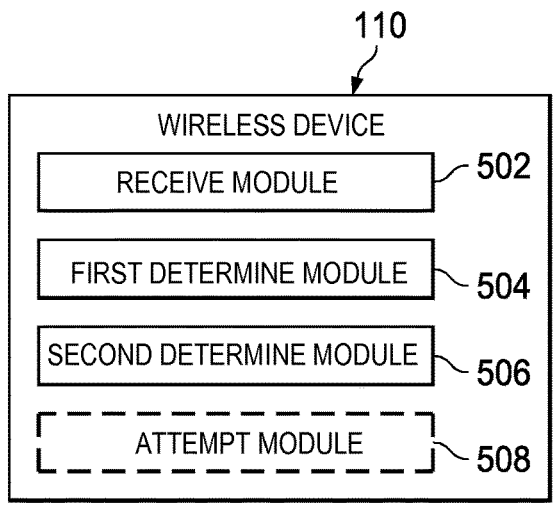
FIG. 5 is a block diagram illustrating structures of an exemplary wireless device configured in accordance with an embodiment of the present disclosure.

Referring to FIG. 5, there is a block diagram illustrating structures of an exemplary wireless device 110 configured in accordance with an embodiment of the present disclosure. In one embodiment, the wireless device 110 may comprise a receive module 502, a first determine module 504, a second determine module 506, and an attempt module 508. The receive module 502 is configured to receive at least one of the FCCH block 104 or the SCH block 106. The first determine module 504 is configured to determine if the received at least one of the FCCH block 104 or the SCH block 106 indicates an implicit reject status is set. In one example, the first determine module 504 is configured to determine if the received FCCH block 104 indicates the implicit reject status is set by detecting a shift of a frequency offset relative to a carrier center frequency in the received FCCH block 104. In another example, the first determine module 504 is configured to determine if the received SCH block 106 indicates the implicit reject status is set by one of the following: (i) reading a single bit indication in a payload part of the SCH block 106; (ii) reading an alternative CRC code in the SCH block 106; (iii) detecting a negative modulation index for GMSK modulation of the SCH block 106; (iv) reading an alternative TSC in the SCH block 106; (v) XORing a bit with a bit in the SCH block 106; (vi) reading a multiple bit indication in a payload part of the SCH block 106; or (vii) some other measure. The second determine module 506 is configured to determine not to attempt to access the wireless communication system 101 (i.e., network node 100) when the received at least one of the FCCH block 104 or the SCH block 106 indicates the implicit reject status is set and when the wireless device 110 has a specific configuration (e.g., low priority access, coverage class, device type). The attempt module 508 is configured to attempt to access the wireless communication system 101 (i.e., network node 100) when the received at least one of the FCCH block 104 or the SCH block 106 indicates the implicit reject status is not set or is set but does not indicate the configuration of the wireless device 110 (i.e., in the latter case, the implicit reject status is technicality not set from the viewpoint of the particular wireless device 110 because the implicit reject status (multi-bit implicit reject status) does not indicate the configuration of the particular wireless device 110, e.g., as illustrated in FIGS. 9-10)

As those skilled in the art will appreciate, the above-described modules 502, 504, 506 and 508 of the wireless device 110 may be implemented separately as suitable dedicated circuits. Further, the modules 502, 504, 506 and 508 can also be implemented using any number of dedicated circuits through functional combination or separation. In some embodiments, the modules 502, 504, 506 and 508 may be even combined in a single application specific integrated circuit (ASIC). As an alternative software-based implementation, the wireless device 110 may comprise the processing module 112 which includes a memory, and a processor (including but not limited to a microprocessor, a microcontroller or a Digital Signal Processor (DSP), etc.), and the transceiver module 114. The memory stores machine-readable program code executable by the processor to cause the wireless device 110 to perform the steps of the above-described method 400. It should be appreciated that the wireless device 110 also includes many other well-known components, but for clarity, only the components needed to describe the features of the present disclosure are described herein.

Further, it should be appreciated that the wireless device 110 may refer generally to an end terminal (user) that attaches to the wireless communication network, and may refer to either an M2M device or MTC device (e.g., smart meter) or a non-M2M/MTC device. Thus, the term may be synonymous with the term mobile device, mobile station (MS), "User Equipment" or UE, as that term is used by the 3rd-Generation Partnership Project (3GPP), and includes standalone wireless devices, such as terminals, IoT devices, cell phones, tablets, smart phones, and wireless-equipped personal digital assistants, as well as wireless cards or modules that are designed for attachment to or insertion into another electronic device, such as a personal computer, electrical meter, etc.

The following is a detailed explanation of the various technical features and various alternative methods 600, 700, 900 and 1000 associated with the present disclosure. In one embodiment, the network node 100 includes an implicit reject flag in the GSM/EDGE frequency correction channel (FCCH) block 104 which is used by mobile devices 110 to synchronize in frequency to a cell. The FCCH block 104 is a single burst block consisting of 142 fixed bits modulated with Gaussian Minimum Shift Keying (GMSK) which is equivalent to an unmodulated carrier that is shifted in frequency by a 67.7 kHz frequency offset when compared to the GSM/EDGE channel center frequency. The FCC block 104 can be used for an indication of the implicit reject status by using, for example, a negative modulation index for the GMSK modulation, an alternative (i.e., alternating) fixed bit pattern or other measures that shift the offset to a level (amount) detectable by the device, e.g., −67.7 kHz (e.g., as illustrated in FIG. 6).

Figure 6:
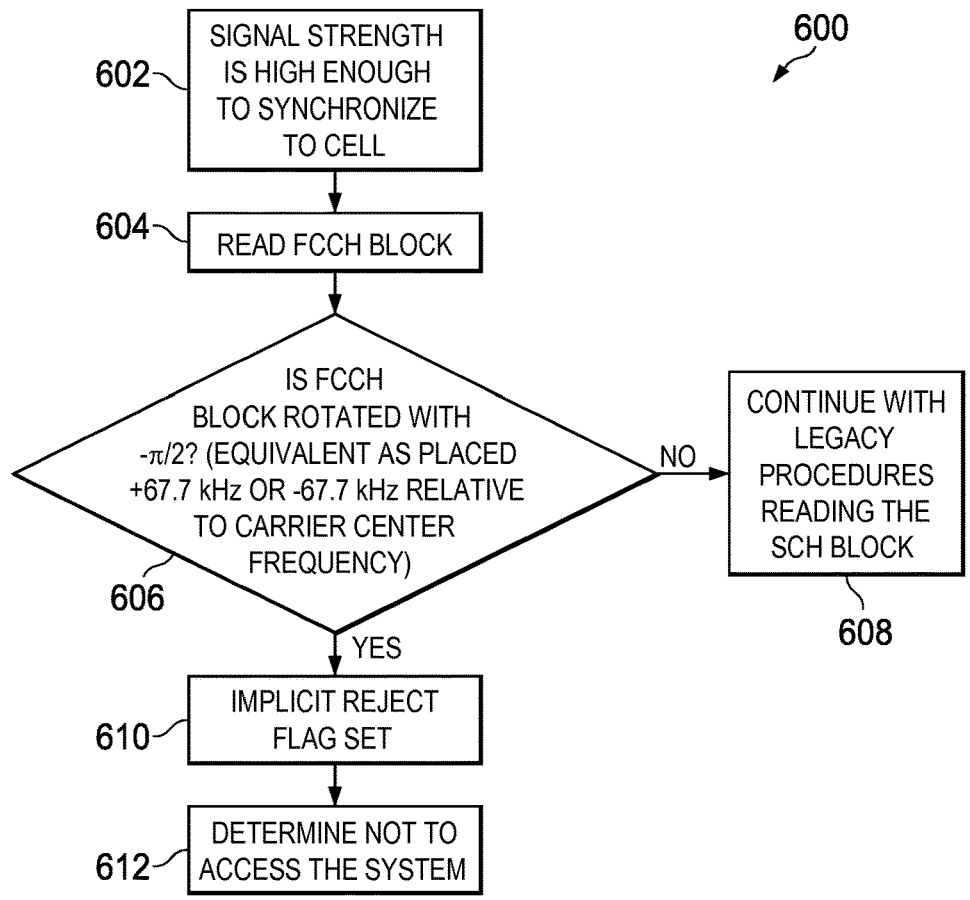
FIG. 6 is a flowchart of a method which is implemented by the wireless device in accordance with an embodiment of the present disclosure.

Referring to FIG. 6, there is a flowchart of a method 600 which is implemented by the wireless device 110 in accordance with an embodiment of the present disclosure (it is to be noted that this method 600 can be referred to as "simple Boolean implicit reject flag on FCCH"). At step 602, the wireless device 110 (e.g., low priority access wireless device 110) determines that a signal strength is high enough to synchronize to a cell. At step 604, the wireless device 110 reads the at least one of a FCCH block 104. At step 606, the wireless device 110 determines if the at least one of the FCCH block 104 is rotated with −π/2 (90 degrees) (equivalent as placed +67.7 kHz or −67.7 kHz relative to carrier center frequency). If the result of step 606 is a determination of no, then the wireless device 110 at step 608 continues with a legacy procedure and reads the at least one of a SCH block 106. If the result of step 606 is a determination of yes, then the wireless device 110 at step 610 knows the implicit reject status is set and at step 612 determines not to attempt to access the wireless communication system 101 (i.e., network node 100).

In another embodiment, the network node 100 includes an implicit reject flag in the GSM/EDGE synchronization channel (SCH) block 106. The SCH block 106 is used by wireless devices 110 to synchronize to the cell in both time and frequency. The SCH block 106 also includes information relating to the frame number and base station identity. Hence, part of the information in the SCH block 106 can be used for indication of the implicit reject status. For instance, a single bit indication for the implicit reject status could be included in the payload part of the SCH block 106. Or, the implicit reject status could be indicated in the SCH block 106 by using, for example, an alternative cyclic redundancy check (CRC) code, a negative modulation index for the GMSK modulation, a multi-bit indication in the payload part of the SCH block 106, an alternative training sequence code (TSC), XORing of the bit with a bit in the transmitted block, for example part of the CRC bits, or other measures (e.g., as illustrated in FIG. 7).

Figure 7:
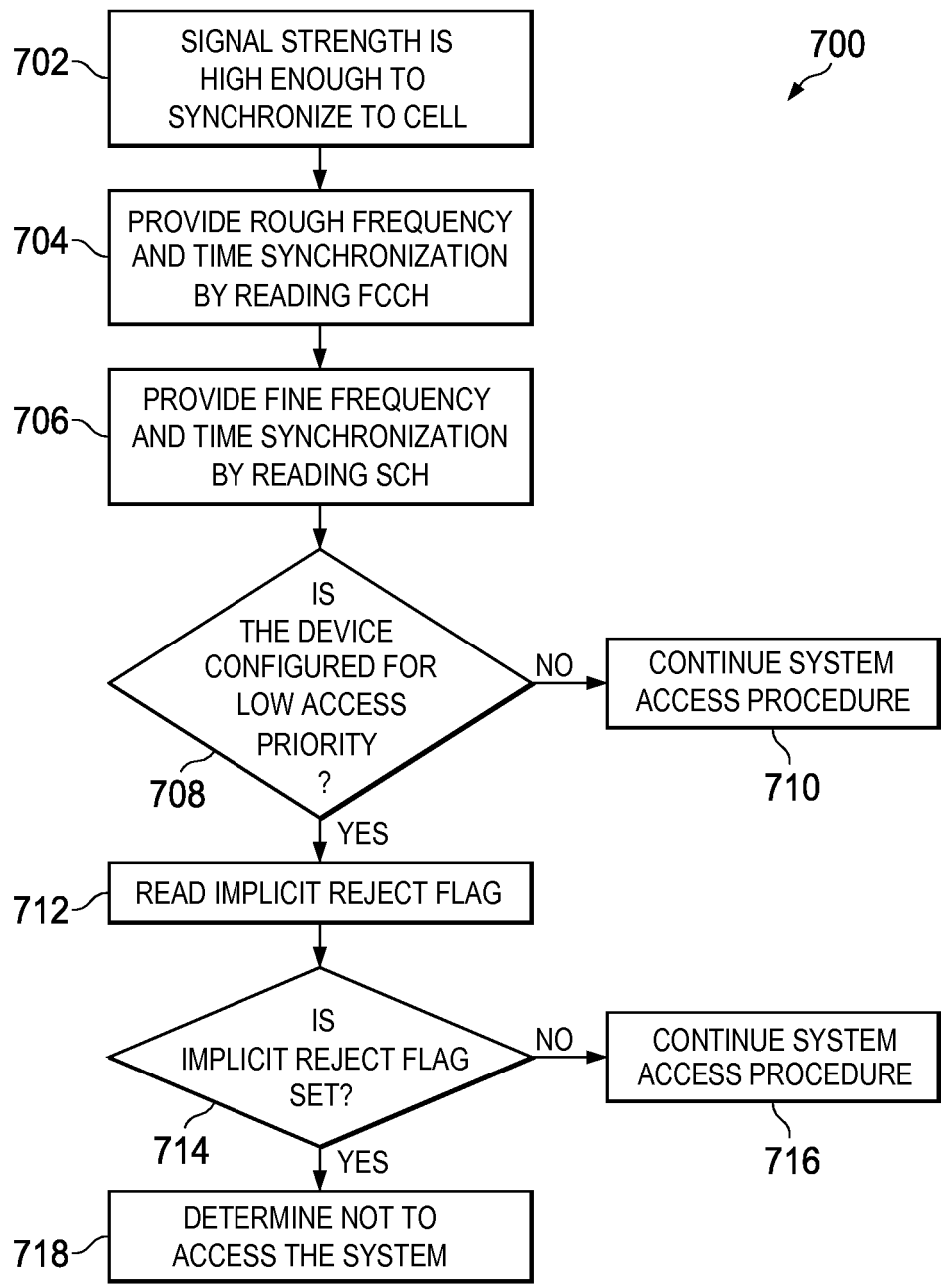
FIG. 7 is a flowchart of a method which is implemented by the wireless device in accordance with another embodiment of the present disclosure.

Referring to FIG. 7, there is a flowchart of a method 700 which is implemented by the wireless device 110 in accordance with an embodiment of the present disclosure (it is to be noted that the method 700 can be referred to as "simple Boolean implicit reject flag on SCH"). At step 702, the wireless device 110 (e.g., low priority access wireless device 110) determines that a signal strength is high enough to synchronize to a cell. At step 704, the wireless device 110 reads the at least one of a FCCH block 104 to provide a rough frequency and time synchronization in the cell. At step 706, the wireless device 110 reads the at least one of a SCH block 106 to provide a fine frequency and time synchronization in the cell. At step 708, the wireless device 110 determines if it is configured for low access priority (i.e., if it is a non-prioritized wireless device 110). If the result of step 708 is a determination of no, then the wireless device 110 at step 710 continues the system access procedure. If the result of step 708 is a determination of yes, then the wireless device 110 at step 712 reads the implicit reject flag. After step 712, the wireless device 110 at step 714 determines if the implicit reject flag is set. If the result of step 714 is a determination of no, then the wireless device 110 at step 716 continues the system access procedure. If the result of step 714 is a determination of yes, then the wireless device 110 at step 718 determines not to access the wireless communication system 101 (i.e., network node 100).

Since both the SCH block 106 and FCCH block 104 are broadcast messages intended for any wireless device 110 camping on a given cell, or intending to camp on a given cell, they need to be dimensioned for the worst coverage class devices, and hence even wireless devices 110 in extreme coverage holes will be able to correctly receive every instance of both these channels and read the implicit reject flag per the two embodiments described above. The FCCH block 104 or SCH block 106 reading may be performed by a wireless device 110 that has, for example, just ended a period of long sleep in order to send an uplink data transmission and as such this can conveniently serve as an opportunity for the wireless device 110 to also acquire the implicit reject flag. By combining FCCH or SCH acquisition with implicit reject status acquisition, a wireless device 110 will not have to delay the uplink data transmission any further by waiting to acquire the implicit reject status through the process of receiving one or more radio blocks on the AGCH or PCH after the wireless device has successfully performed the FCCH or SCH acquisition. One other benefit of allowing the FCCH or SCH to also support the transmission of implicit reject status is the power savings by the wireless device 110 that would otherwise not be possible if the implicit reject status information was acquired separately (by reading AGCH/PCH blocks) after acquisition of the FCCH or SCH information. The acquisition of implicit reject status information could in practice be combined with the acquisition of any type of information that a wireless device 110 requires prior to being able to attempt system access. It should be noted that controlling the system access of the wireless device 110 via the implicit reject 'flag' need not only be limited to an 'all' or 'nothing' case but the implicit reject 'flag' could consist of multiple bits and thereby include different levels of access barring for wireless devices 110 of different priority levels or e.g., different coverage classes as elaborated in more detail below.

In another embodiment, the implicit reject functionality is defined not only to apply to wireless devices 110 configured for low access priority (non-priority) but to also limit the allowed access based on a coverage class of the wireless device 110. A "coverage class" is defined as a set of wireless devices 110 requiring the same number of repetitions of a block to communicate with the network (either DL or UL), according to one embodiment. In a congested, or close to congested scenario, the wireless devices 110 in bad coverage (needing a larger number of repetitions) will with high probability collide with other wireless devices 110 experiencing better coverage (needing a smaller number of repetitions) when accessing the network on a collision based channel, e.g., the random access channel (RACH).

Figure 8:
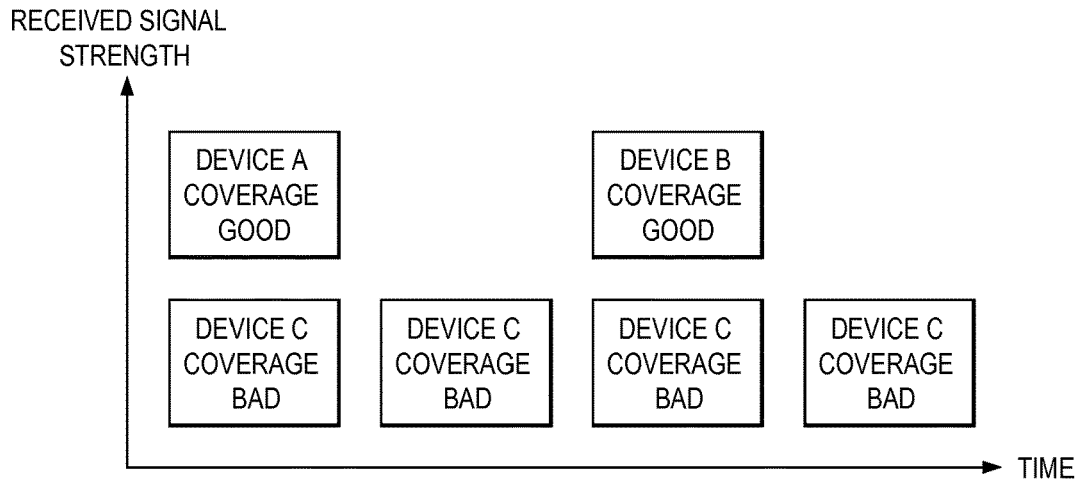
FIG. 8 is a graph illustrating a received signal strength vs. time for wireless devices of different coverage classes.

In such a scenario the wireless devices 110 in better coverage will be received with a higher signal level, thereby "masking" the access attempt of a wireless device 110 in worse coverage. This is illustrated in FIG. 8 where, for example, Device C needs four transmissions and is received at a lower signal level than both Device A and Device B which each may only need one transmission. In this example, Device C is only being correctly received in 2 out of 4 transmissions which may not be sufficient to correctly receive the block. As such, one way to allow improved probability of system access for wireless devices 110 which need multiple repetitions (such as device C) is therefore to support a more comprehensive implicit reject flag (i.e., a multi-bit mask) that is capable of indicating when any given subset of access coverage classes are not allowed to perform system access (e.g., as illustrated in FIG. 9). For this type of implicit reject flag, each bit or bit combination in the mask will e.g., correspond to a different access coverage class thereby allowing system control of access attempts from all access coverage classes independently. The period for which the mask is set to disable access attempts for any given subset of access coverage classes is network dependent.

Referring to FIG. 9, there is a flowchart of a method 900 which is implemented by the wireless device 110 in accordance with another embodiment of the present disclosure (it is to be noted that method 900 can be referred to as "coverage class centric implicit reject field on SCH"). At step 902, the wireless device 110 (having a specific coverage class) determines that a signal strength is high enough to synchronize to a cell. At step 904, the wireless device 110 reads the FCCH block 104 to provide a rough frequency and time synchronization in the cell. At step 906, the wireless device 110 reads the at least one of a SCH block 106 to provide a fine frequency and time synchronization in the cell. At step 908, the wireless device 110 reads the implicit reject field in the SCH block 106 which, for example, contains multiple bits where each bit or bit combination corresponds to a specific coverage class. At step 910, the wireless device 110 determines if it has a coverage class that is indicated by the implicit reject field to have system access rejected. If the result of step 910 is a determination of no, then the wireless device 110 at step 912 continues the system access procedure. If the result of step 910 is a determination of yes, then the wireless device 110 at step 914 determines not to access the wireless communication system 101 (i.e., network node 100).

It is also possible that wireless devices 110 can be configured according to their type such as 'basic telemetry', 'minor alarm', 'major alarm', etc., and the implicit reject flag in the SCH block 106 could be made more comprehensive by having a multi-bit mask where each bit or bit combination corresponds to a specific device type. Further, each bit or bit combination can at the same time also provide for time intervals during which different subsets of device types can be granted system access opportunities (e.g., as illustrated in FIG. 10). In yet another embodiment, a multi-bit mask and in particular the different bits or bit combinations in the multiple bit indication can be used to identify subsets of wireless devices 110 including wireless devices that are in a visited PLMN, wireless devices attempting non-prioritized access, no wireless devices or all wireless devices.

Referring to FIG. 10, there is a flowchart of a method 1000 which is implemented by the wireless device 110 in accordance with yet another embodiment of the present disclosure (it is to be noted that the method 1000 can be referred to as "device type centric implicit reject field on SCH"). At step 1002, the wireless device 110 (having a specific device type) determines that a signal strength is high enough to synchronize to a cell. At step 1004, the wireless device 110 reads the FCCH block 104 to provide a rough frequency and time synchronization in the cell. At step 1006, the wireless device 110 reads the at least one of a SCH block 106 to provide a fine frequency and time synchronization in the cell. At step 1008, the wireless device 110 reads the implicit reject field in the SCH block 106 which, for example, contains multiple bits where each bit or bit combination corresponds to a specific device type (e.g., 'basic telemetry', 'minor alarm', 'major alarm'). At step 1010, the wireless device 110 determines if it has a device type that is indicated by the implicit reject field to have system access rejected. If the result of step 1010 is a determination of no, then the wireless device 110 at step 1012 continues the system access procedure. If the result of step 1010 is a determination of yes, then the wireless device 110 at step 1014 determines not to access the wireless communication system 101 (i.e., network node 100).

As a result of the foregoing disclosure, it can be appreciated that using a FCCH or SCH centric approach so the wireless device 110 can acquire implicit reject status information provides various benefits including (but not limited to): (1) no impact on the system's AGCH/PCH capacity when the system is supporting the presence of wireless devices 110 operating in extended coverage, compared to using the current solution available which involves multiple repetitions of AGCH blocks and PCH blocks; (2) reduced wireless device power consumption and reduced delay in performing an uplink data transmission can both be realized by wireless devices 110 combining the acquisition of implicit reject status information with the requirement to acquire FCCH or SCH prior to making a system access; and (3) available bandwidth within the SCH payload space can be used to realize more than a simple Boolean form of Implicit Reject status information thereby allowing finer granularity of system access control to be exercised by the network (e.g., as illustrated in FIGS. 9-10). It should also be appreciated that although the features in the present disclosure are exemplified in GSM/EDGE, other types of wireless communication systems may be able to similarly employ the functionality described herein including, for example, UTRAN, WCDMA, LTE, and WiMAX systems.

In the foregoing description, numerous specific details are set forth. However, it is understood that embodiments of the present disclosure may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Further it should be noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A network node configured to control system overload in a wireless communication system, the network node comprising:
   a processing module configured to indicate an implicit reject status in a synchronization channel (SCH) block;
   a transceiver module configured to transmit the SCH block to at least one wireless device, wherein the implicit reject status indicates if a system access is allowed by the at least one wireless device prior to the at least one wireless device attempting the system access;
   wherein the processing module is configured to indicate the implicit reject status in the SCH block by using a part of the SCH block; and,
   wherein the processing module is configured to use the part of the SCH block to indicate the implicit reject status by including a multiple bit indication in a payload part of the SCH block.

2. The network node of claim 1, wherein each wireless device is configured to have a specific coverage class, and each bit or bit combination in the multiple bit indication corresponds to a different coverage class.

3. The network node of claim 1, wherein each wireless device is configured according to a specific type, and each bit or bit combination in the multiple bit indication corresponds to a different type and provides for a time interval during which the different type of wireless device is granted system access opportunities.

4. The network node of claim 1, wherein the wireless device obtains the implicit reject status without being required to read a downlink (DL) Access Grant Channel (AGCH) block or a Paging Channel (PCH) block in addition to reading the SCH block.

5. The network node of claim 1, wherein the transceiver module is further configured to transmit multiple repetitions of the SCH block when the at least one wireless device is operating in extended coverage.

6. The network node of claim 1, wherein the SCH block is a broadcast message intended for any wireless device that is camping on a given cell or intending to camp on a given cell.

7. A method in a network node of a wireless communication system configured to control system overload, the method comprising:
   indicating an implicit reject status in a synchronization channel (SCH) block;
   transmitting the SCH block to at least one wireless device, wherein the implicit reject status indicates if a system access is allowed by the at least one wireless device prior to the at least one wireless device attempting the system access;
   wherein the step of indicating the implicit reject status in the SCH block further comprises using a part of the SCH block; and,
   wherein the using step comprises including a multiple bit indication in a payload part of the SCH block.

8. The method of claim 7, wherein each wireless device is configured to have a specific coverage class, and each bit or bit combination in the multiple bit indication corresponds to a different coverage class.

9. The method of claim 7, wherein each wireless device is configured according to a specific type, and each bit or bit combination in the multiple bit indication corresponds to a different type and provides for a time interval during which the different type of wireless device is granted system access opportunities.

10. The method of claim 7, wherein the wireless device obtains the implicit reject status without being required to read a downlink (DL) Access Grant Channel (AGCH) block or a Paging Channel (PCH) block in addition to reading the SCH block.

11. The method of claim 7, wherein the transmitting step further comprises transmitting multiple repetitions of the SCH block when the at least one wireless device is operating in extended coverage.

12. The method of claim 7, wherein the SCH block is a broadcast message intended for any wireless device that is camping on a given cell or intending to camp on a given cell.

13. A wireless device configured to interface with a wireless communication system and further configured to control system overload, the wireless device comprising:
a transceiver module configured to receive a synchronization channel (SCH) block;
a processing module configured to determine whether the received SCH block indicates an implicit reject status is set, wherein the implicit reject status indicates if a system access is allowed by the wireless device prior to the wireless device attempting the system access; and,
wherein the processing module is configured to determine whether the received SCH block indicates the implicit reject status is set by reading a multiple bit indication in a payload part of the SCH block.

14. The wireless device of claim 13, wherein the wireless device is configured to have a specific coverage class, and each bit or bit combination in the multiple bit indication corresponds to a different coverage class.

15. The wireless device of claim 13, wherein the wireless device is configured to have a specific type, and each bit or bit combination in the multiple bit indication corresponds to a different type and provides for a time interval during which the wireless device is granted a system access opportunity.

16. The wireless device of claim 13, wherein the wireless device is configured to be a non-priority access type such that when the received SCH block indicates the implicit reject status is set, the wireless device determines not to attempt to access the wireless communication system.

17. The wireless device of claim 13, wherein the processing module further configured to not attempt to access the wireless communication system when the received SCH block indicates the implicit reject status is set and when the wireless device has a specific configuration.

18. The wireless device of claim 13, wherein the wireless device is an Internet of Things (IoT) wireless device.

19. The wireless device of claim 13, wherein the wireless device obtains the implicit reject status without being required to read a downlink (DL) Access Grant Channel (AGCH) block or a Paging Channel (PCH) block in addition to reading the SCH block.

20. The wireless device of claim 13, wherein the transceiver module is further configured to receive multiple repetitions of the SCH block when the wireless device is operating in extended coverage.

21. The wireless device of claim 13, wherein the SCH block is a broadcast message intended for any wireless device that is camping on a given cell or intending to camp on a given cell.

22. A method in a wireless device configured to interface with a wireless communication system and further configured to control system overload, the method comprising:
receiving a synchronization channel (SCH) block;
determining whether the received SCH block indicates an implicit reject status is set, wherein the implicit reject status indicates if a system access is allowed by the wireless device prior to the wireless device attempting the system access; and,
wherein the step of determining whether the received SCH block indicates the implicit reject status is set further comprises reading a multiple bit indication in a payload part of the SCH block.

23. The method of claim 22, wherein the wireless device is configured to have a specific coverage class, and each bit or bit combination in the multiple bit indication corresponds to a different coverage class.

24. The method of claim 22, wherein the wireless device is configured to have a specific type, and each bit or bit combination in the multiple bit indication corresponds to a different type and provides for a time interval during which the wireless device is granted a system access opportunity.

25. The method of claim 22, wherein the wireless device is configured to be a non-priority access type such that when the received SCH block indicates the implicit reject status is set, the wireless device determines not to attempt to access the wireless communication system.

26. The method of claim 22, further comprising not attempting to access the wireless communication system when the received SCH block indicates the implicit reject status is set and when the wireless device has a specific configuration.

27. The method of claim 22, wherein the wireless device is an Internet of Things (IoT) wireless device.

28. The method of claim 22, wherein the wireless device obtains the implicit reject status without being required to read a downlink (DL) Access Grant Channel (AGCH) block or a Paging Channel (PCH) block in addition to reading the SCH block.

29. The method of claim 22, wherein the receiving step further comprises receiving multiple repetitions of the SCH block when the wireless device is operating in extended coverage.

30. The method of claim 22, wherein the SCH block is a broadcast message intended for any wireless device that is camping on a given cell or intending to camp on a given cell.

* * * * *